United States Patent
Parham et al.

(10) Patent No.: US 6,879,564 B2
(45) Date of Patent: Apr. 12, 2005

(54) METHOD FOR DESIGNATING COMMUNICATION PATHS IN A NETWORK

(75) Inventors: Jeffrey B. Parham, Redmond, WA (US); Mark R. Brown, Seattle, WA (US); William B. Lees, Redmond, WA (US); Van H. Vu, Bellevue, WA (US); Laszlo Lovasz, Sammamish, WA (US); Nicholas J. A. Harvey, Redmond, WA (US); Katalin Vesztergombi, Sammamish, WA (US)

(73) Assignee: Microsoft Corp., Redmond, WA (US)

( * ) Notice: Subject to any disclaimer, the term of this patent is extended or adjusted under 35 U.S.C. 154(b) by 912 days.

(21) Appl. No.: 09/795,202

(22) Filed: Feb. 28, 2001

(65) Prior Publication Data

US 2002/0120770 A1 Aug. 29, 2002

(51) Int. Cl.⁷ .............................................. H04L 12/28
(52) U.S. Cl. ...................................... 370/256; 709/241
(58) Field of Search ........................ 370/238, 254–256, 370/351; 709/238–241

(56) References Cited

U.S. PATENT DOCUMENTS 4,864,559 A  *  9/1989  Perlman ..................... 370/256

5,291,477 A  *  3/1994  Liew .......................... 370/238

OTHER PUBLICATIONS

Eisner, State-of-the-Art Algorithms for Minimum Spanning Trees—A Tutorial Discussion, University of Pennsylvania, pp. 1–78, 197.*

* cited by examiner

*Primary Examiner*—Frank Duong
(74) *Attorney, Agent, or Firm*—Leydig, Voit & Mayer, Ltd.

(57) ABSTRACT

A method for designating communication paths in a computer network is provided, in which communication paths are designated for the transmission of data throughout a network. The network may have both recipient computers, which are the intended recipients of the data, and intermediary computers, which are not the intended recipients, but merely relay the data. Each intermediary computer is grouped with the "closest" recipient computer (i.e. the recipient computer with whom it is "least expensive" to communicate). Communication paths between the resulting groups are then identified. A representation of the network is then created. The representation replaces the intermediary computers with the inter-group communication paths, so that the inter-group communication paths appear to pass directly through the locations occupied by the intermediary computers. The created representation is then further processed so that the "least expensive" communication paths may be designated.

27 Claims, 12 Drawing Sheets

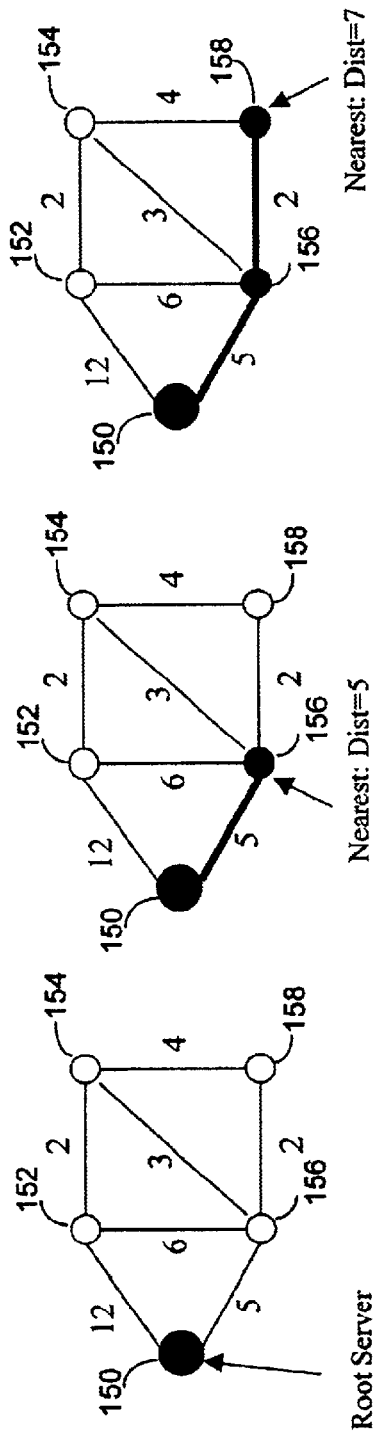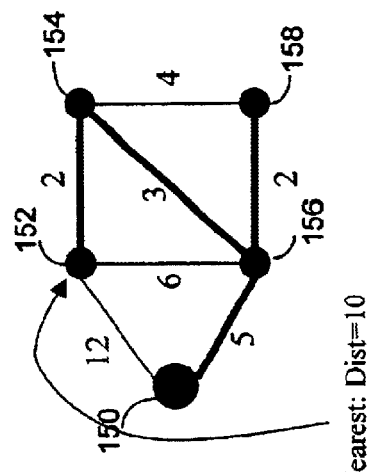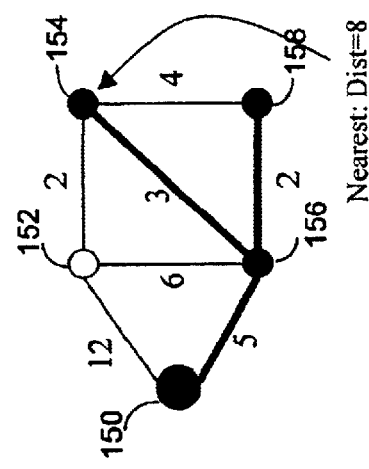

METHOD FOR DESIGNATING COMMUNICATION PATHS IN A NETWORK

TECHNICAL FIELD

The invention relates generally to the transmission of data to multiple computers in a computer network and, more particularly, to a designating the minimum-cost paths for disseminating data in a computer network.

BACKGROUND OF THE INVENTION

In the field of computer networking, many efforts have been made to determine the best way for servers within a computer network to communicate with one another. In particular, the problem of which network links to use has been a challenge. While there may be a dozen paths that communication between two computers may use, only one or two of those paths may actually be the best. In making this determination, a network engineer may have a set of parameters to follow. These parameters may include: minimizing the distance that communications need to travel, maximizing the bandwidth available for each communication, or minimizing the amount of money spent creating the links between the computers. Such parameters will hereinafter be grouped under the general category of "cost." In other words, a network engineer tries to minimize the cost of sending messages between computers in a network. The "cost" of a network link as used herein may include, but is not limited to, one or more of the following: the time it takes for data to travel over the link, the physical length of the link, or the monetary cost of the link. Thus, if travel time is being used as a parameter, then a "cheap" link is one that is relatively fast, whereas an "expensive" link is relatively slow.

Several techniques have been developed to create minimum-cost network topologies. However, many of these techniques become unworkable when the problem of intermediate servers is introduced into a network. Intermediate servers are those servers that co-exist in a network with the servers for which communication is being optimized, but are not the intended recipients of the message. Those servers that are the intended recipients will be referred to herein as "recipient servers."

For example, servers on computer networks may share what is known as a "multi-master" or "distributed" database, in which multiple servers share responsibility for keeping the contents of the database current. An example of such a database is the MICROSOFT ACTIVE DIRECTORY SERVICE. Copies of parts or all of a shared database may be stored on several servers. When one server makes a change to a portion of the database, that change needs to be transmitted to all of the other servers that possess copies of that portion. Transmitting database changes from one server to another is also known as "replicating" the changes. Replication among the various servers of a network takes place according to an established pattern or "replication topology." Those servers that share the responsibility for maintaining the shared database will be referred to herein as "replicating servers." A replicating server is one implementation of a "recipient server."

There are many situations in which a network may have both replicating servers and intermediate servers. One such situation is when a shared database is divided into several partitions, in which a server may only exchange database updates with another server in the same partition. For example, a corporate directory may be divided into sales, development and marketing partitions, such that sales servers only replicate with other sales servers, development servers only replicate with other development servers, and marketing servers only replicate with other marketing servers. In such a network, dissimilar servers would be seen as intermediate servers with respect to one another. For example, marketing servers and development servers would be seen as intermediate servers by the sales servers, since sales data would not be replicated by the other two types of servers, but would simply be passed through. Data replicated between recipient servers may have to pass through these intermediate servers, and therefore they may need to be considered when determining a minimum-cost replication scheme.

Thus it can be seen that there is a need for a new method for designating communication paths in a computer network.

SUMMARY OF THE INVENTION

In accordance with the foregoing, a method for designating communication paths in a computer network is provided. According to the invention, communication paths are designated for the transmission of data throughout a network that has both recipient computers, which are the intended recipients of the data, and intermediary computers, which are not the intended recipients, but merely relay the data. Each intermediary computer is grouped with the "closest" recipient computer (i.e. the recipient computer with whom it is "least expensive" to communicate). Communication paths between the resulting groups are then identified. A representation of the network is then created. The representation replaces the intermediary computers with the inter-group communication paths, so that the inter-group communication paths appear to pass directly through the locations occupied by the intermediary computers. The created representation is then further processed so that the "least expensive" communication paths may be designated.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 3a–3e, are an example of a procedure that may be followed in an embodiment of the invention to create a tree for a shortest path forest;

DETAILED DESCRIPTION OF THE INVENTION

Although it is not required, the invention may be implemented by program modules that are executed by a computer. Generally, program modules include routines, objects, components, data structures and the like that perform particular tasks or implement particular abstract data types. A program may include one or more program modules. The invention may be implemented on a variety of types of computers, including personal computers (PCs), hand-held devices, multi-processor systems, microprocessor-based programmable consumer electronics, network PCs, minicomputers, mainframe computers and the like. The invention may also be employed in distributed computing environments, where tasks are performed by remote processing devices that are linked through a communications network. In a distributed computing environment, modules may be located in both local and remote memory storage devices.

Figure 1:
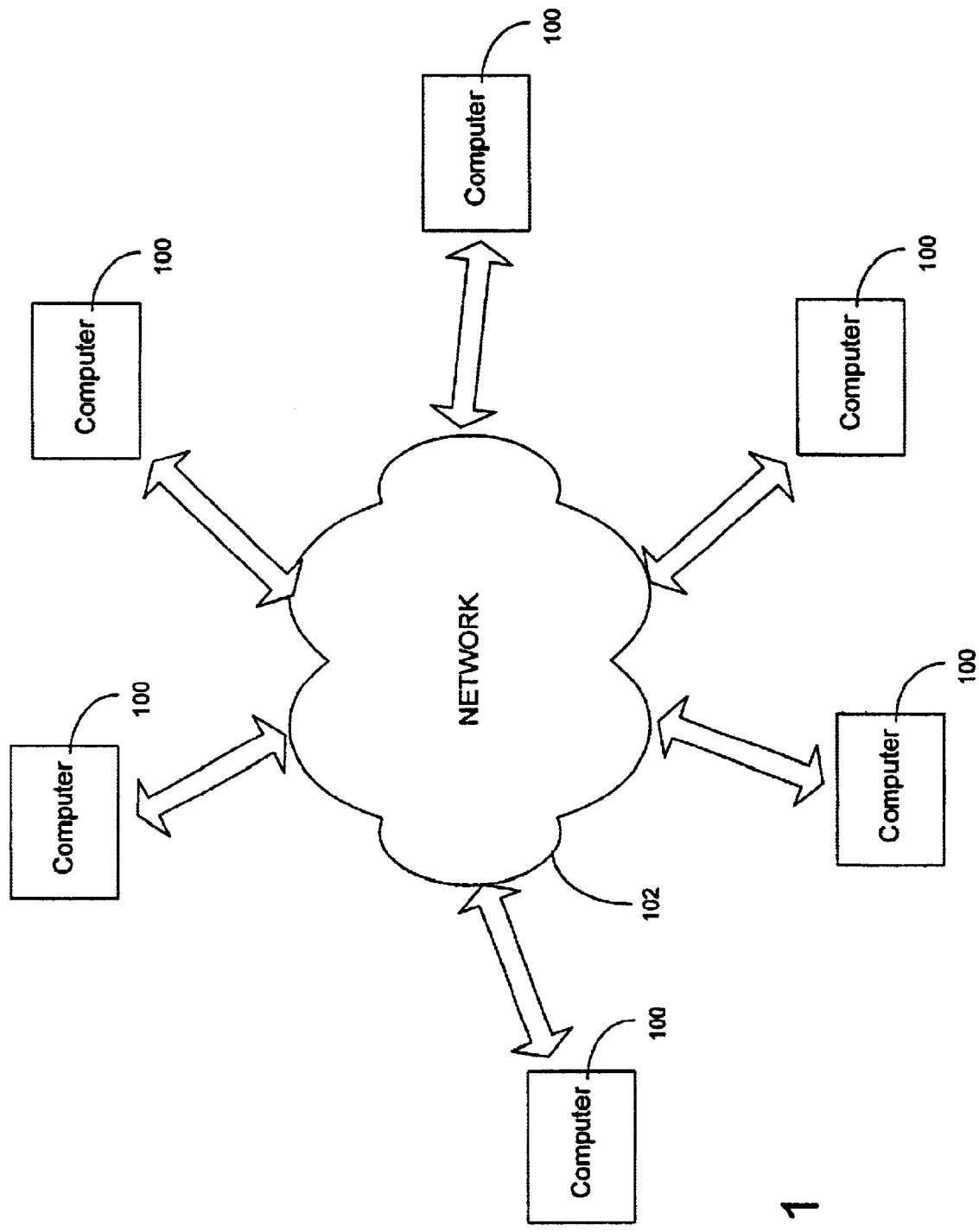
FIG. 1 is an example of a computer network.

An example of a networked environment in which this system may be used will now be described with reference to FIG. 1. The example network includes several computers 100 communicating with one another over a network 102, represented by a cloud. Network 102 may include many well-known components, such as routers, gateways, hubs, etc. and may allow the computers 100 to communicate via wired and/or wireless media.

Figure 2:
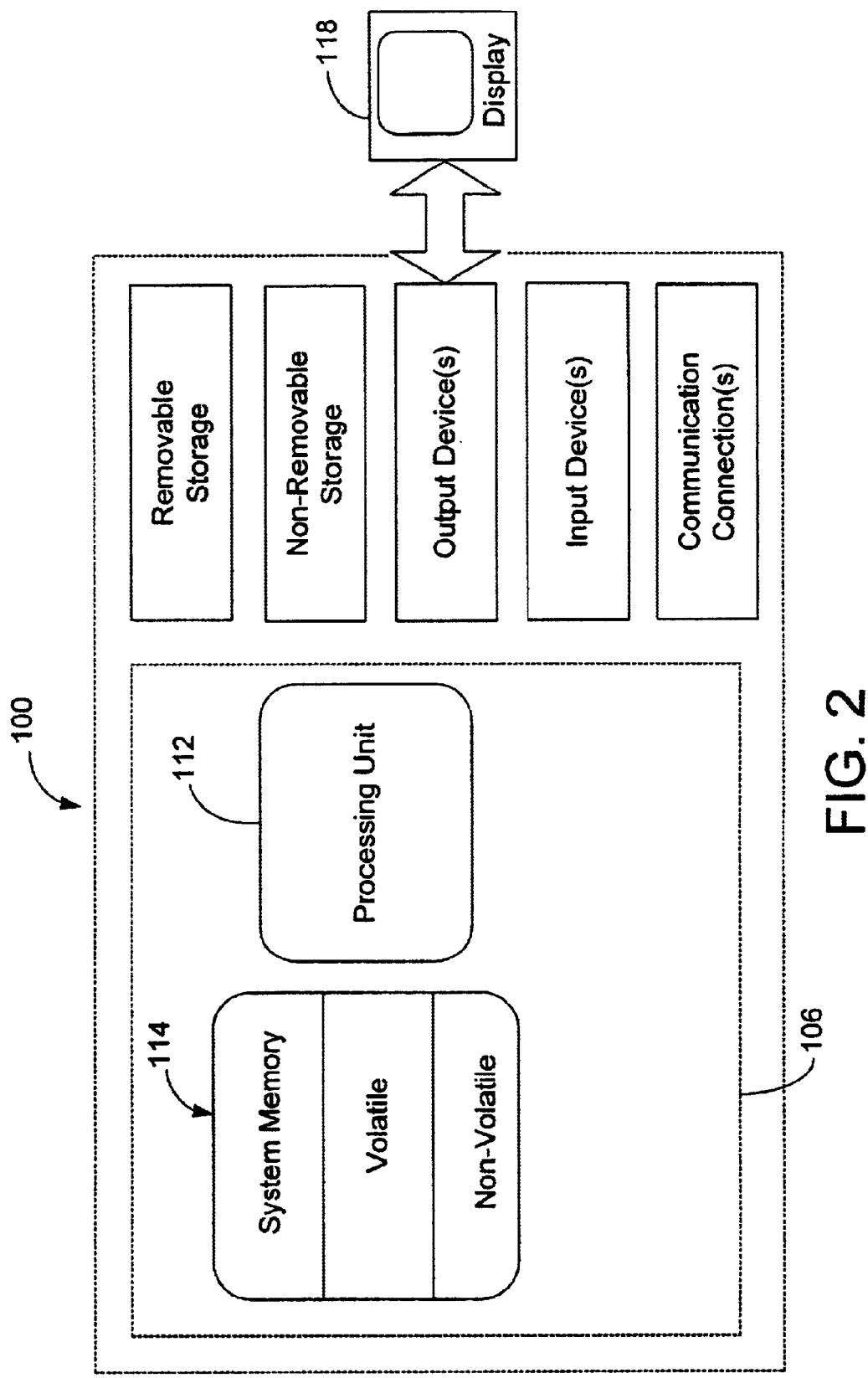
FIG. 2 is an example of a computer.

Referring to FIG. 2, an example of a basic configuration for a computer on which the system described herein may be implemented is shown. In its most basic configuration, the computer 100 typically includes at least one processing unit 112 and memory 114. Depending on the exact configuration and type of the computer 100, the memory 114 may be volatile (such as RAM), non-volatile (such as ROM or flash memory) or some combination of the two. This most basic configuration is illustrated in FIG. 2 by dashed line 106. Additionally, the computer may also have additional features/functionality. For example, computer 100 may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 100. Any such computer storage media may be part of computer 100.

Computer 100 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Computer 100 may also have input devices such as a keyboard, mouse, pen, voice input device, touch input device, etc. Output devices such as a display 116, speakers, a printer, etc. may also be included. All these devices are well known in the art and need not be discussed at length here.

According to an embodiment of the invention, the topology of a computer network having intermediate servers may be generated or reorganized so that each intermediate server is grouped with the recipient server with which it is cheapest to communicate. These groupings will be referred to herein as "trees," with the collection of trees being referred to as a "shortest-path forest." In a shortest-path forest, each tree has a replicating server as its "root," and possibly one or more intermediate servers as its "branches." Links between these groups or "trees" may then be identified and the paths between recipient servers through the branches and through the inter-tree links may be represented without the intermediate servers. As used herein, the terms "shortest path" "closest" and the like do not necessarily equate to physical distance, but are rather meant to be expressions of cost as defined in the Background section. In other words, two servers having a direct link between them that is relatively cheap are said to be "close." Likewise, the "shortest path" between two servers is really the "cheapest" path in terms of bandwidth, monetary cost, speed, physical distance or whatever other criteria is being used to set up the communication topology.

In one embodiment of the invention, a shortest path forest is first generated using a procedure that is based on Dijkstra's Algorithm. According to this procedure, the replicating servers are designated as the roots. Then, each intermediate server is grouped with the root having the cheapest link to it. Referring to FIGS. 3a–3e, an example of a procedure that may be followed in an embodiment of the invention to create a tree for a shortest path forest is shown. It is assumed in this example that server 150 is a recipient server, while servers 152, 154, 156 and 158 are intermediate servers. The costs of the links between the servers is also shown. For example, the cost of the link between server 152 and 154 is 2 units. Again, the units can signify any factor or combination of factors that need to be minimized.

According to the procedure, the server 150 is designated as the root server as shown in FIG. 3a. Server 156 is then determined to be the intermediate server that is closest to the root server (i.e. the intermediate server to which the link is cheapest), since the link to it costs 5. The server 156 is therefore added to the shortest path tree (FIG. 3b). In the following phase of the procedure, the server 158 is determined to be the next closest intermediate server (with a cost of 5+2=7). The server 158 is thus added to the tree (FIG. 3c). The program continues this process as shown in FIGS. 3d–3e, until all intermediate servers are grouped into the tree. The result is a shortest path tree that has server 150 as its root and servers 152, 154, 156 and 158 as its branches via the boldfaced links.

Figure 4:
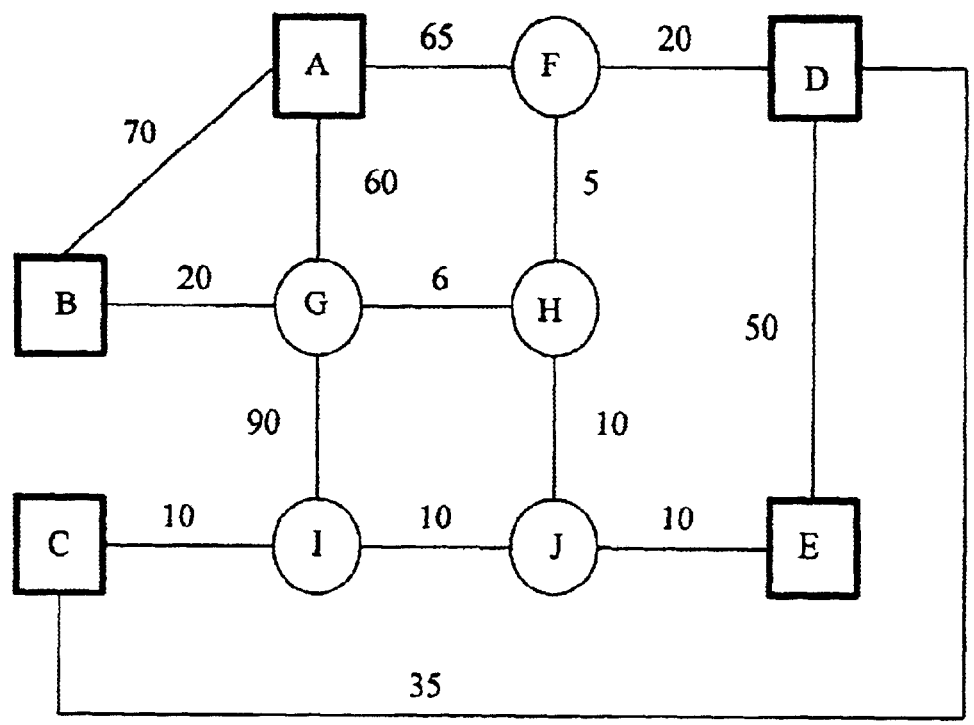
FIG. 4 shows a network having both recipient servers and intermediate servers.
Figure 4C:
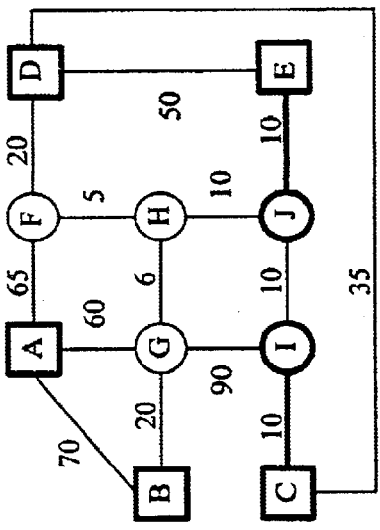
FIGS. 4a–4e show how an example of how to create a shortest-path forest from the network of FIG. 4.
Figure 4B:
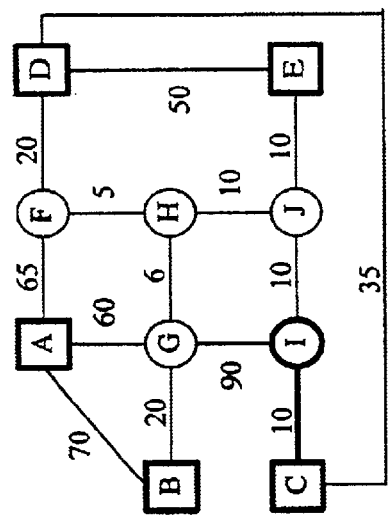
Figure 4A:
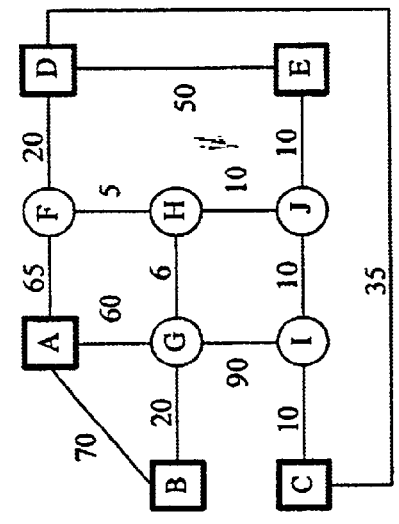
Figure 4F:
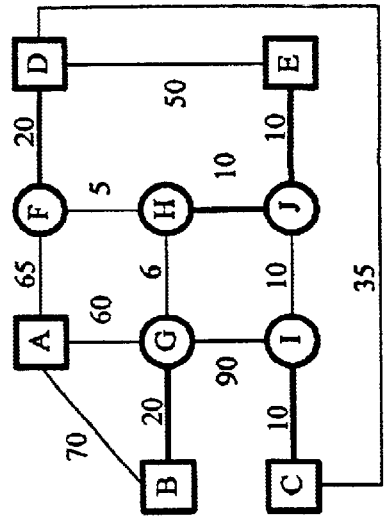
Figure 4E:
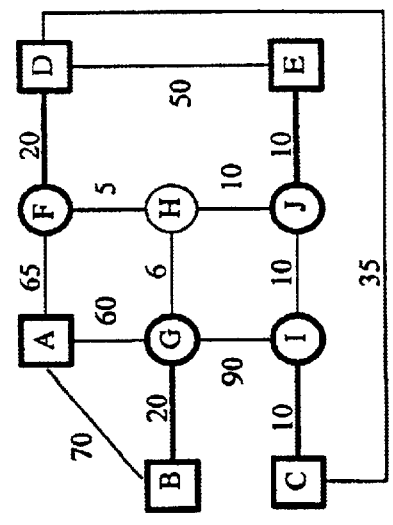
Figure 4D:
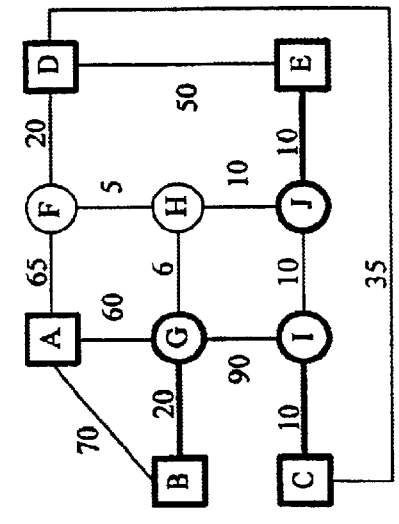

An example of a procedure that creates a shortest-path forest according to an embodiment of the invention will now be described. To aid in this example, a network having both recipient servers and intermediate servers is shown in FIG. 4. The network, generally labeled 180, maintains a directory service database that is shared by servers A–J. These servers replicate changes to the database to one another. The database is divided into several partitions, including a "sales partition." The sales partition is maintained by sales servers A–E while the other partitions are maintained by intermediate servers F–J. The cost of each link is also shown. To create a shortest path forest from the network 180, the recipient servers A–E are designated to be roots, as shown in FIG. 4a. Then, the intermediate server that is closest to the roots is identified. In this example, intermediate servers I and J are each 10 units away from the roots (servers C and E). Thus, server I is grouped with server C, and server J is grouped with server E (FIGS. 4b and 4c). Since servers I and J have already been grouped with respective roots, they should not be grouped with any other roots. The procedure then continues as shown in FIGS. 4d and 4e, in which the next closest intermediate servers are identified and grouped with the root servers to which they are closest. Thus, server G is grouped with server B, while server F is grouped with server D. Thus far, four trees have been created, having servers B, C, D and E as their roots. Since all of the intermediate servers having direct links to root servers have been accounted for, the procedure will move on to the next layer of intermediate servers. In this example, there is only one intermediate server remaining—server H. The root server closest to server H is server E, with a total distance (i.e. cost) of 20 units. This includes the distance of 10 from server H to server J plus the distance of 10 from server J to server E. Thus, server H is added on as a "branch" to the tree whose root is server E.

Figure 5:
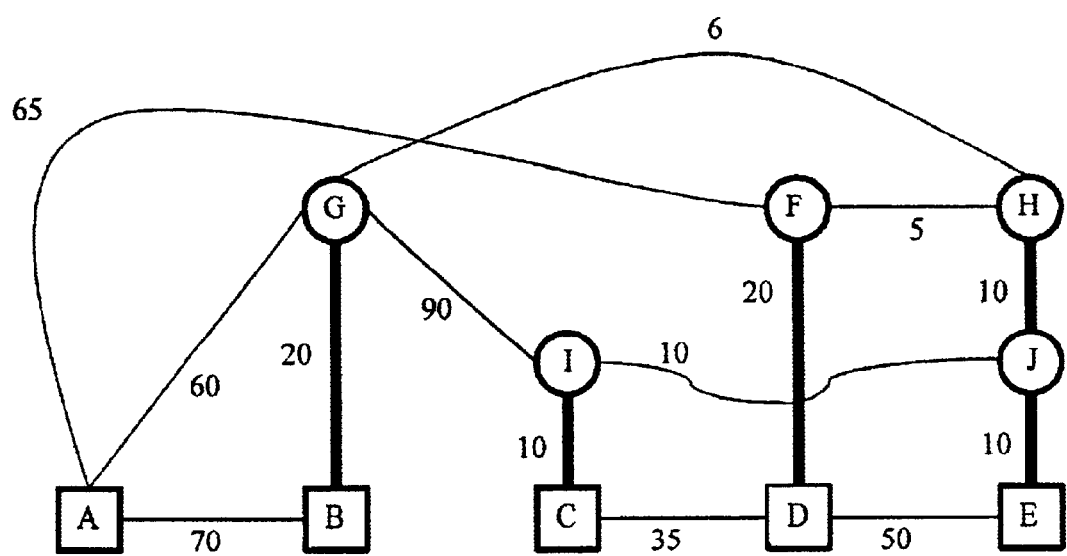
FIG. 5 shows how the network of FIG. 4 may then be redrawn after a shortest-path forest has been created.
Figure 6:
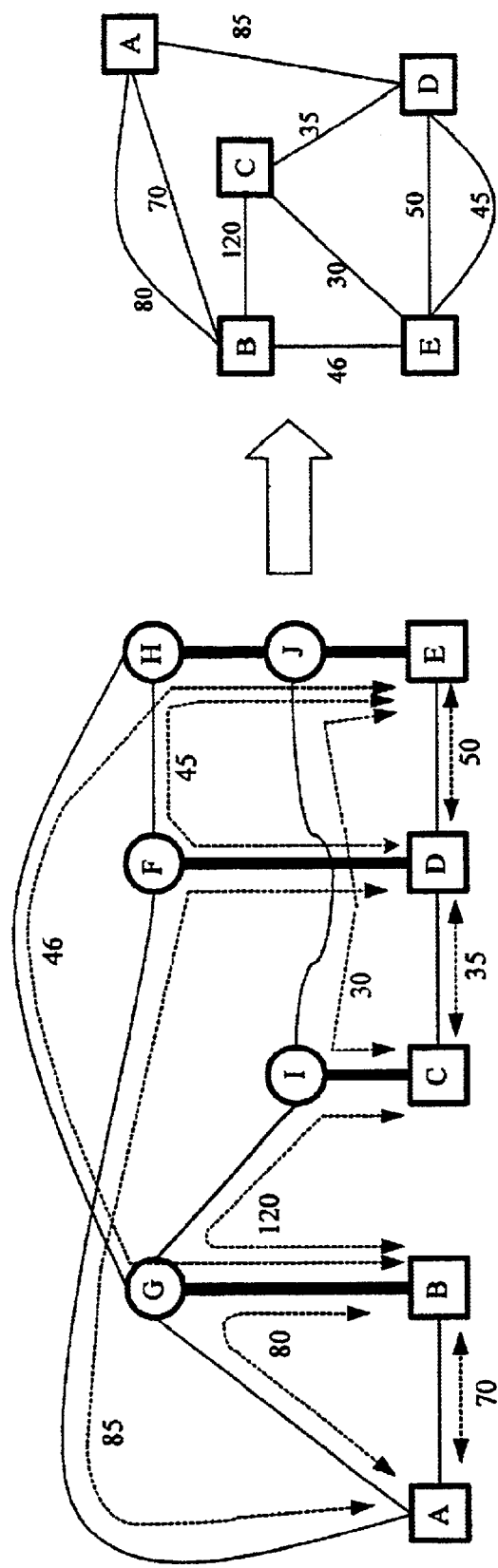
FIG. 6 illustrates a modified network representation that does not have intermediary servers.

Once all of the servers of the network 180 have been grouped into trees, the shortest-path forest can be considered complete. The network 180 may then be redrawn so that the roots of the trees are at the bottom, as shown in FIG. 5. As shown, the trees do not touch one another. Based on the shortest-path forest representation of the network, the intermediate servers G–J can be eliminated, leaving only the sales servers A–F. In an embodiment of the invention, this may be accomplished by the following: for each link in the shortest-path forest that connects two trees, calculating the total cost of the path that connects the roots of the two trees over those links—including any intervening branches, and creating a new replication topology map that shows the link as passing directly from one root to another, without any intervening servers, and having the calculated total cost. This is illustrated in the modified network representation 190 of FIG. 6.

Now, the most efficient network links for the recipient servers of the network 180 to use for communication can be determined. Typically, determining which network links to use for sending data between recipient servers involves three goals. First, all recipient servers should be connected in the communication topology. Second, redundant communication paths should be avoided. Finally, the total cost of the network links used in the topology should be minimized. One way to fulfill these three goals is to create a so-called "minimum-cost spanning tree"—referred to herein as a "spanning tree." Several methods exist for creating a spanning tree, one of which involves the use of Kruskal's algorithm, developed by Joseph Kruskal of BELL LABS. This method involves:

(1) Finding the cheapest link that has not yet been considered;

(2) If the link is not redundant, adding it to the tree;

(3) If there are no more edges, stopping the procedure; and, (4) If there are more edges, repeating steps (1)–(3).

Figure 7A:
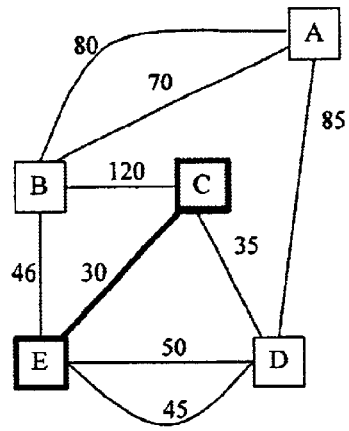
FIGS. 7a–7g show an example how a spanning tree may be created from the modified network representation of FIG. 6.
Figure 7B:
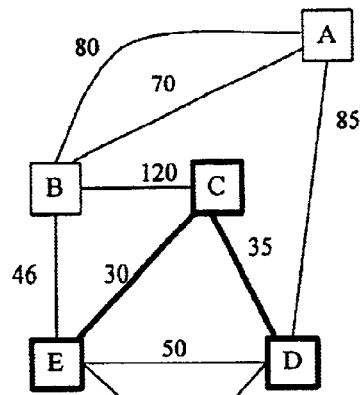
Figure 7C:
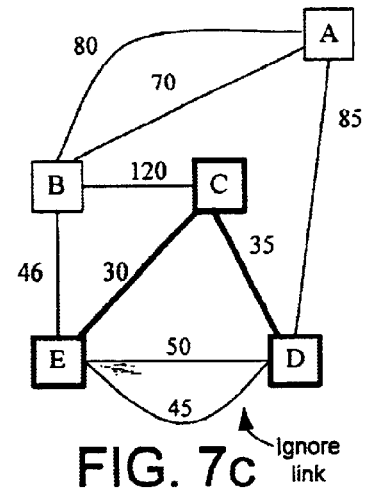
Figure 7D:
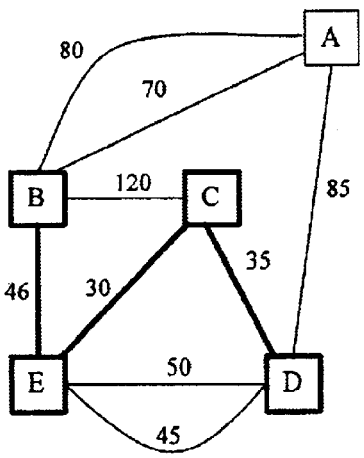
Figure 7E:
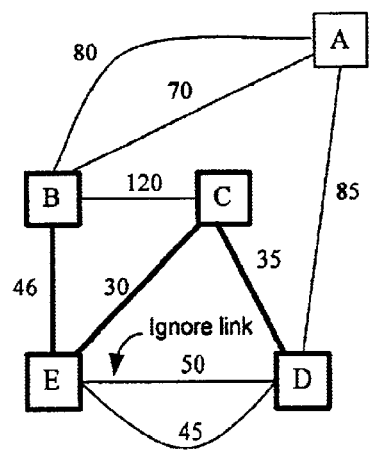
Figure 7F:
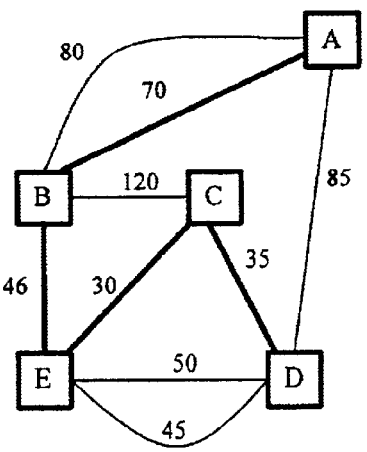
Figure 7G:
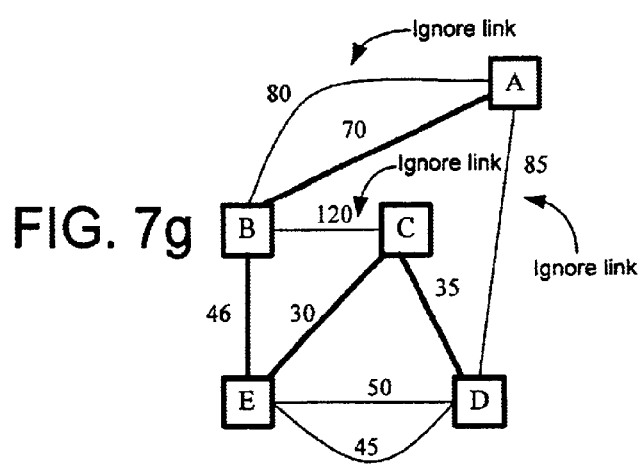
Figure 8:
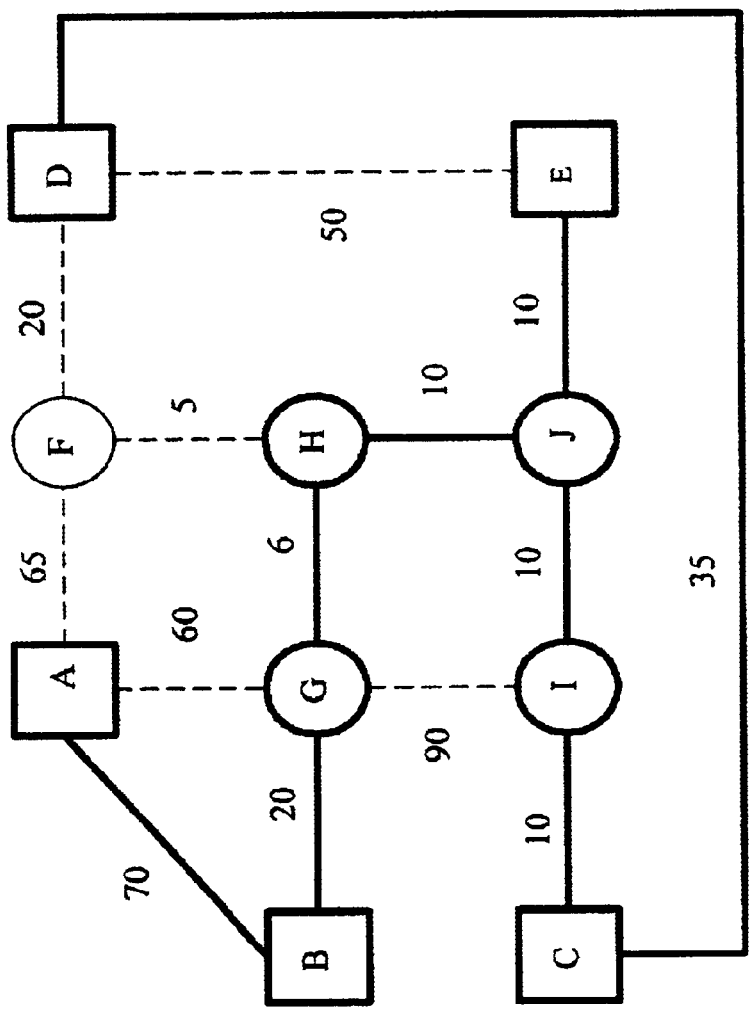
FIG. 8 shows the final topology of the network of FIG. 4 after a procedure is performed according to an embodiment of the invention.

Referring to FIGS. 7a–7g, an example how a spanning tree may be created from the modified network representation 190 will now be described. First, the cheapest link is identified. In this case, the cheapest link is the one between servers E and C. Since the link is not redundant, it is added to the spanning tree (FIG. 7a). The next cheapest link is the one between servers C and D. Again, since the link is not redundant, it is added to the spanning tree (FIG. 7b). The process then moves to the next cheapest link, which is the 45-unit link between servers E and D. This link is redundant, since there is already a path between servers E and D in the spanning tree—namely, the path that passes through server C (FIG. 7c). The process then continues, and the link between servers B and E is added (FIG. 7d), the 50-unit link between servers E and D is ignored (FIG. 7e), the link between servers B and A is added (FIG. 7f), and the remaining links that are not already in the spanning tree are ignored (FIG. 7g). At this point, the generation of the communication topology for the network 180 (FIG. 4) is complete. The final version of the topology is illustrated in FIG. 8, with the intermediate servers being shown in their respective positions. The total cost of the communication path (in bold) is 181 units.

In the previous examples, it has been assumed that there is full connectivity between the various servers of the network 180. In reality certain links may not have full connectivity with one another, even if they have endpoints at the same server. For example, a bridge may be required to get data from one link to another. When bridges are present, the above-described procedure may have to be modified so that a shortest-path forest is generated for each bridge prior to the creation of a minimum-cost spanning tree. Also, some links may use incompatible transport protocols, or be available only at certain times. In such cases, the above-described procedure may also have to be modified so that those servers that share a transport protocol or have compatible schedules are treated separately for the purpose of generating a shortest-path forest.

In an embodiment of the invention, the network 180 (FIG. 4) is implemented as a shared database network in which servers A–E are replicating servers and servers F–J are intermediate servers. For example, the network 180 may be a directory service network that is partitioned between sales, marketing and development. The servers A–E may be sales servers, and have the need to replicate sales directory changes to one another, while the servers F–J may be either marketing or development servers, which do not change the sales directory and do not need to receive sales directory changes. In this embodiment, the goal of the shortest-path forest and spanning tree procedures described in conjunction with FIG. 4, FIGS. 4a–j, FIG. 5, FIG. 6, FIGS. 7a–7g and FIG. 8 is to establish the most optimal replication paths between replicating servers A–E.

Figure 9:
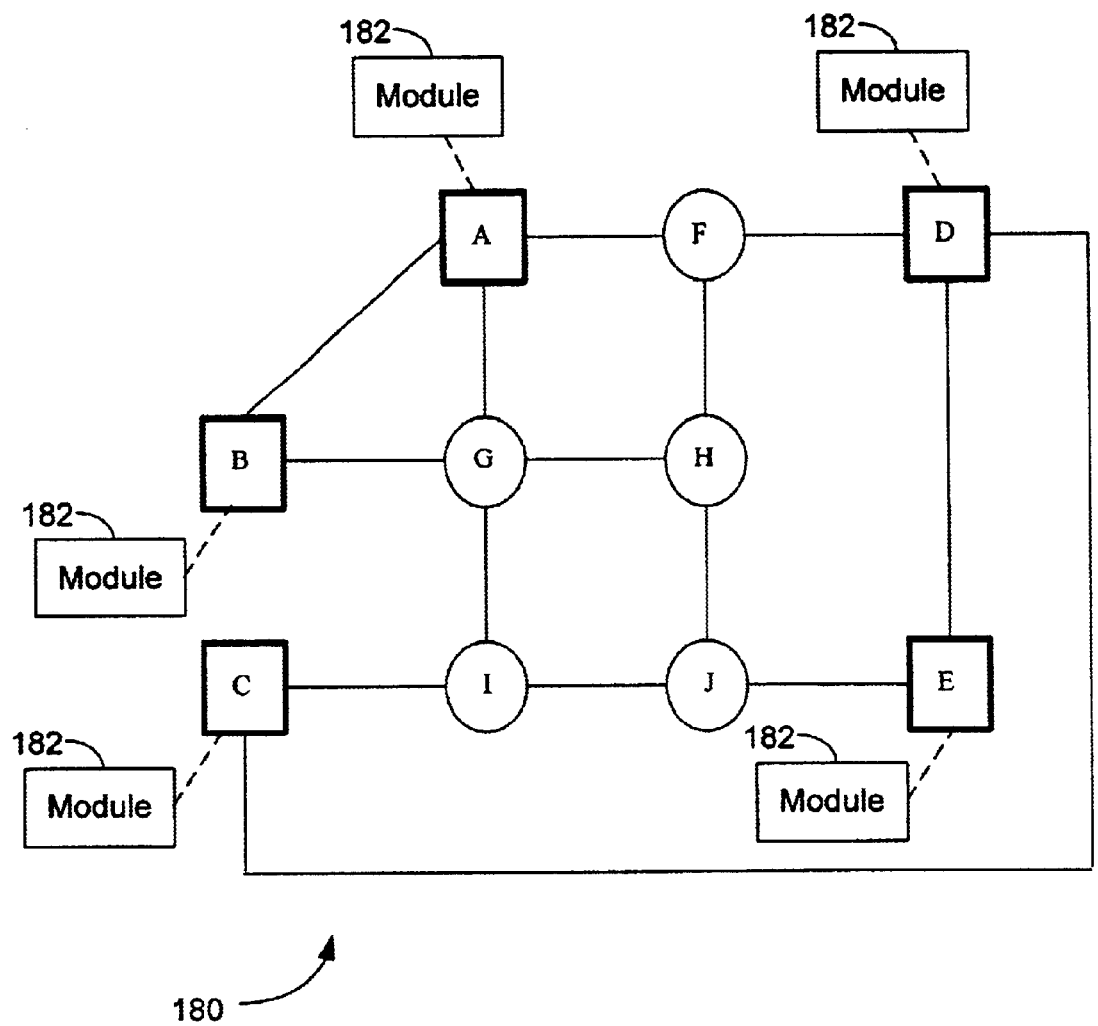
FIG. 9 shows an example architecture of an embodiment of the invention.

There are many ways to implement the present invention in software. In one implementation, illustrated in FIG. 9, a software module 182 executes on each of the recipient servers A–E, maintains a communication topology map, and is responsible for communicating with the other servers as necessary. For example, if the network 180 is a shared database network, then the software module 182 on each recipient (i.e. replicating) server A–E would be responsible for maintaining a replication topology map and for ensuring that all database updates that occurred locally are replicated to other replicating servers along the designated replication paths.

The invention described herein may be used to establish communication paths between computers located at the same site and/or between groups of computers located at different sites. Referring to FIG. 4, for example, the servers A–E may represent five satellite offices located in five different cities. Each satellite office may have dozens of computers, but with only one server in the office designated to communicate outside of the site. There may be one communication topology map for communication within a site and another map for communication between sites.

When implemented on a shared database network, it may be desirable to modify certain aspects of the invention in order to account for read-only servers. For example, in a directory service database, some servers may hold 'writeable' copies of a partition, while others may hold 'read-only' copies. In such a scenario, database replication may be set up so that changes are only replicated from writeable servers. In other words, replication between two writeable servers occurs in both directions, but if a writeable server and a read-only server are involved, then replication only occurs from the writeable server to the read-only server, and not vice versa.

According to an embodiment of the invention, additional parameters may be included in the process of designating communication links in order to account for the presence of read-only servers. These parameters include, but are not limited to:

(1) All writeable servers should be linked to one another without any intervening read-only servers;

(2) Read-only servers should be connected to the writeable servers so that they can replicate in any changed data; and, (3) Read-only servers should not replicate in from other read-only servers, since the other read-only servers cannot possibly have any changes. However, read-only servers may replicate from other read-only servers if required by the communication links of the network. An example would be where a read-only server was connected to the rest of the network solely by a link to another read-only server that was, itself, well connected to the rest of the network.

Figure 10:
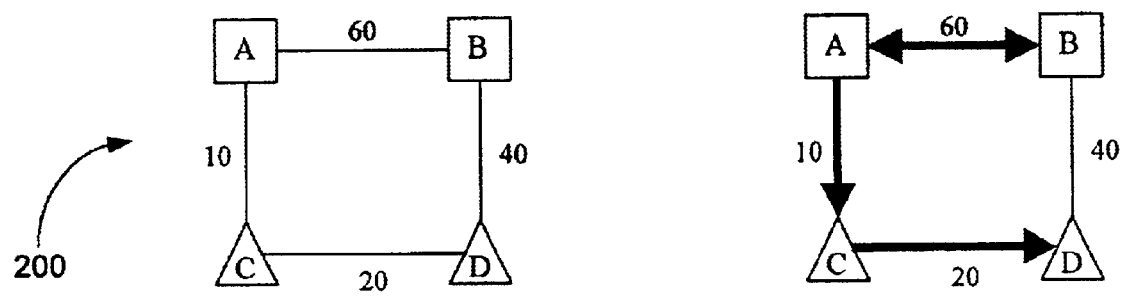
FIG. 10 shows how communication may occur in a network having some servers that are designated as read-only and some servers that are designated as writeable; and, FIG. 11 shows an example of how a two-tier topology may result when read-only and writeable servers are used in an embodiment of the invention.

To illustrate an implementation of these parameters, a simple network, generally labeled 200, is shown in FIG. 10, with the resulting spanning tree next to it. Even though the link between servers A and B is the most expensive, parameter number one indicates that it should be used for replication, since servers A and B are both writeable. Additionally, since server D is read-only, any changes to it must have come from server C. Thus, server C does not have to replicate from server D.

Figure 11:
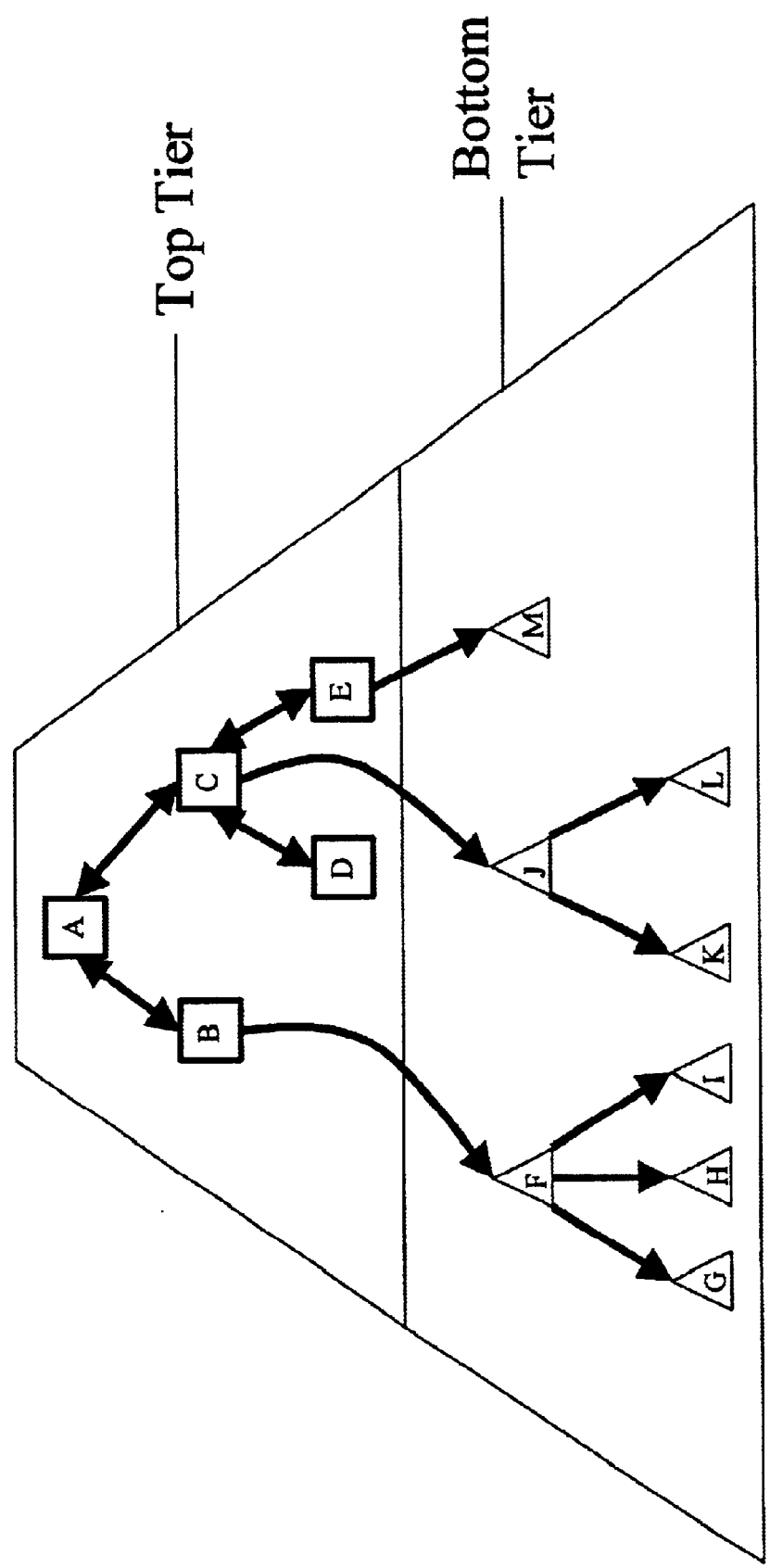

As a result, when there are both writeable and read-only servers in a shared-database network, and this embodiment of the invention is used, the replication topology ends up being a 'two-tiered' tree, in which the top tier includes all of the writeable servers linked in a bi-directional minimum spanning tree, and the bottom tier includes the read-only servers. The bottom tier may include several trees appended to the tier, in which replication occurs in a downward direction. In this example, "downward" means "away from the writeable servers." An example of a two-tier tree is shown in FIG. 11. As it can be seen, some read-only servers are closer to the writeable servers than other read-only servers, but the closer read-only servers don't need to replicate in from the farther ones.

It can thus be seen that a new a useful method for designating communication paths in a network has been provided. In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for designating communication paths for transmitting data in a computer network, the computer network having a plurality of computers that are the intended recipients of the data and one or more computers that are intermediaries with respect to the data, the method comprising:

for each intermediary computer, determining which recipient computer of the plurality of recipient computers to which it is most optimal for the intermediary computer to communicate and grouping the intermediary computer with the determined recipient computer, thereby creating a plurality of groups;

identifying one or more inter-group communication paths through the network that connect two or more groups of the plurality of groups;

creating a representation of the network having a plurality of communication paths, in which the intermediary computers are replaced with the inter-group communication paths, such that the inter-group communication paths pass directly through the locations occupied by the intermediary computers; and, designating the most optimal communication paths on the created network representation as being the paths over which the data is to be transmitted.

2. A computer-readable medium having stored thereon computer-executable instructions for performing the method of claim 1.

3. The method of claim 1, wherein the transmitted data is a message that being disseminated to all of the computers that are intended recipients, wherein the intermediary computers do not process or read the message, but only relay it to other computers, and wherein the intended recipient computers do read and process the message.

4. The method of claim 1, wherein the determining step further comprises: for each intermediary computer, determining which recipient computer of the plurality of recipient computers has the fastest communication path to the intermediary computer and grouping the intermediary computer with that recipient computer.

5. The method of claim 1, wherein the determining step further comprises: for each intermediary computer, determining which recipient computer of the plurality of recipient computers has the shortest path, in terms of physical distance, to the intermediary computer and grouping the intermediary computer with that recipient computer.

6. The method of claim 1, wherein the determining step further comprises: for each intermediary computer, determining which recipient computer of the plurality of recipient computers has the least expensive, in terms of monetary cost, communication path to the intermediary computer and grouping the intermediary computer with that recipient computer.

7. The method of claim 1, wherein each of the plurality of created groups includes a single recipient computer.

8. The method of claim 1, wherein each of the plurality of created groups includes a single recipient computer and one or more intermediary computers.

9. The method of claim 1, wherein some of the recipient computers have read-only copies of the data, and the rest of the recipient computers have writeable copies of the data, the method further comprising insuring that those computers having writeable copies of the data have one or more designated communication paths to other computers having writeable copies of the data that do not pass through computers having read-only copies of the data.

10. In a computer network having a plurality of recipient computers, one or more intermediary computers, and a plurality of communication links over which the computers of the network communicate, each link having an associated cost, a method for designating which of the communication links are to be used to transmit data, wherein each recipient computer is an intended recipient of the data and each intermediary computer is an intermediary with respect to the transmitted data, the method comprising:

representing the network as a forest, wherein the forest comprises a plurality of trees, each tree having a recipient computer as its root, wherein each intermediary computer is designated as a branch of a tree so as to minimize the cost of the communication links between the intermediary computer and the root of the tree;

identifying communication links between the trees of the forest;

for each pair of trees for which links have been identified, representing the recipient computers that are the roots of the trees as being directly linked without any intermediary computers, thereby creating a communication topology map for the network;

generating a minimum-cost spanning tree from the created communication topology map, wherein the minimum-cost spanning tree comprises the cheapest non-redundant links for the recipient computers in the network to use for communication; and, designating the links of the minimum-cost spanning tree as the links over which the computers are to transmit data.

11. A computer-readable medium having stored thereon computer-executable instructions for performing the method of claim 10.

12. The method of claim 10, wherein the cost associated with each link is based on the speed of the link.

13. The method of claim 10, wherein the cost associated with each link is based on the monetary cost of the link.

14. The method of claim 10, wherein the forest is implemented as a Dijkstra shortest-path forest.

15. The method of claim 10, wherein the spanning tree is implemented as a Krukal's spanning tree.

16. The method of claim 10, wherein the forest is implemented as a Dijkstra shortest-path forest, and wherein the spanning tree is implemented as a Krukal's spanning tree.

17. The method of claim 10, wherein the trees of the forest do not intersect.

18. The method of claim 10, wherein the communication topology map is created by adding the cost of the links between a pair of trees with the cost of the links of the branches of the pair of trees to arrive at a total cost and creating a representation of a link directly between the roots of the pair of trees that has an associated cost equal to the total cost, so that there is no longer a need to represent the intermediary computers of each tree.

19. A method for creating a replication topology for a network having replicating servers and intermediary servers, wherein the replicating servers share a common database and replicate changes to database to one another, the method comprising:

grouping each intermediary server with the replicating server with which it is least expensive to communicate, thereby creating a shortest-path tree;

determining the total cost of sending replicated changes between pairs of the replicating servers via their respective shortest-path trees;

creating a replication path cost map having only replicating servers, wherein each of the pairs of replicating servers is represented as being able to communicate by a direct link having a cost equal to the determined total cost; and, designating the least expensive, non-redundant paths on the cost map as the paths over which the replicating servers are to send replicated changes to one another.

20. A computer-readable medium having stored thereon computer executable instructions for performing the method of claim 19.

21. The method of claim 19, wherein the common database is a directory service, and the replicating servers share a common partition within the directory service.

22. The method of claim 19, wherein the replicated changes are disseminated to all of the replicating computers, and wherein the intermediary computers do not replicate the changes.

23. The method of claim 19, wherein the determining step further comprises: determining which paths enable replicated changes to be transmitted at the highest speed.

24. The method of claim 19, wherein the determining step further comprises: determining which paths enable replicated changes to be transmitted at the lowest monetary cost.

25. The method of claim 19, wherein the network includes one or more bridges, the method further comprising repeating the grouping, determining, creating and designating steps for each of the one or more bridges.

26. The method of claim 19, wherein the network uses one or more schedules, the method further comprising repeating the grouping, determining, creating and designating steps for each of the one or more schedules.

27. The method of claim 19, wherein the network includes one or more transports, the method further comprising repeating the grouping, determining, creating and designating steps for each of the one or more transports.

* * * * *